UNITED STATES PATENT OFFICE.

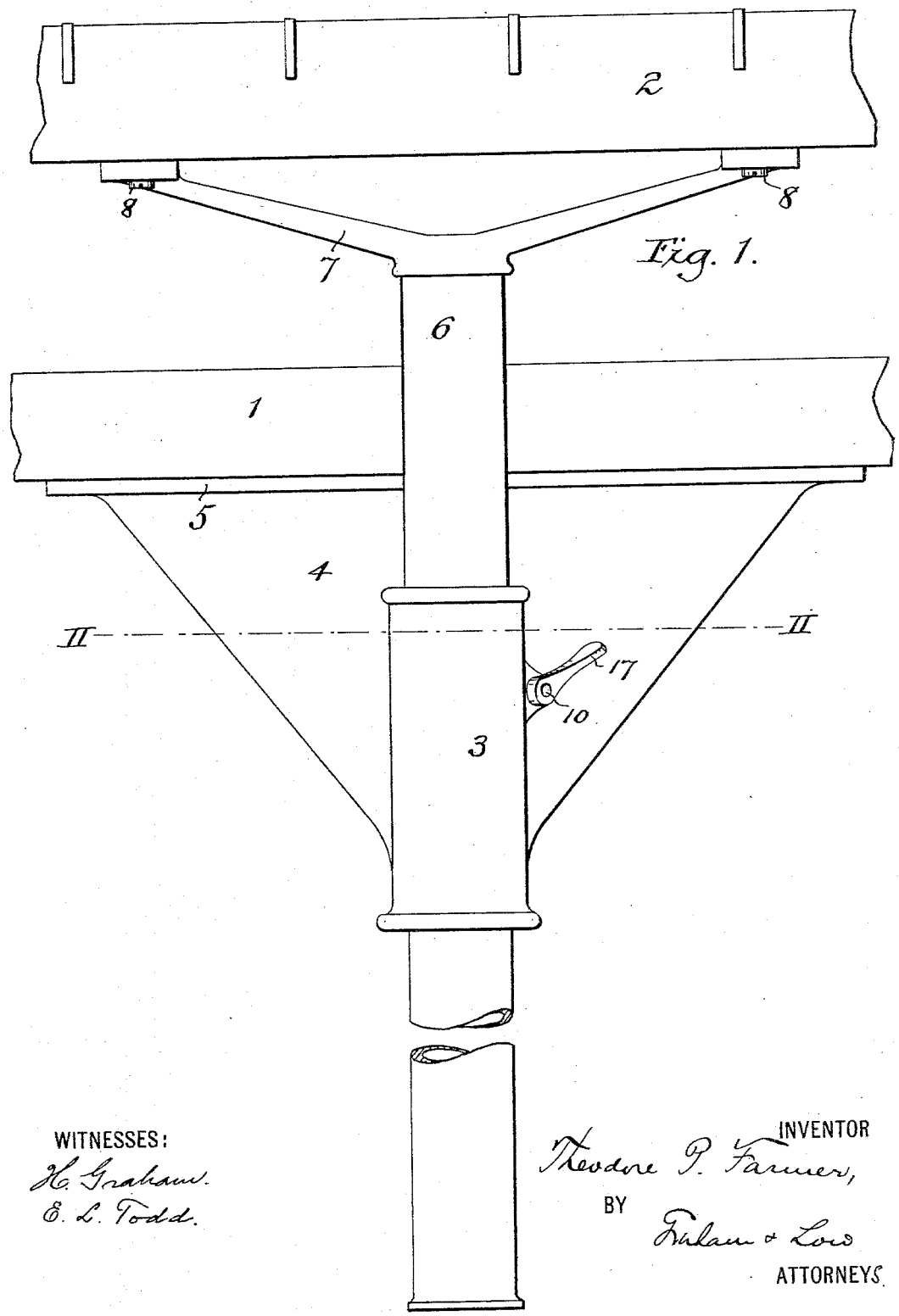

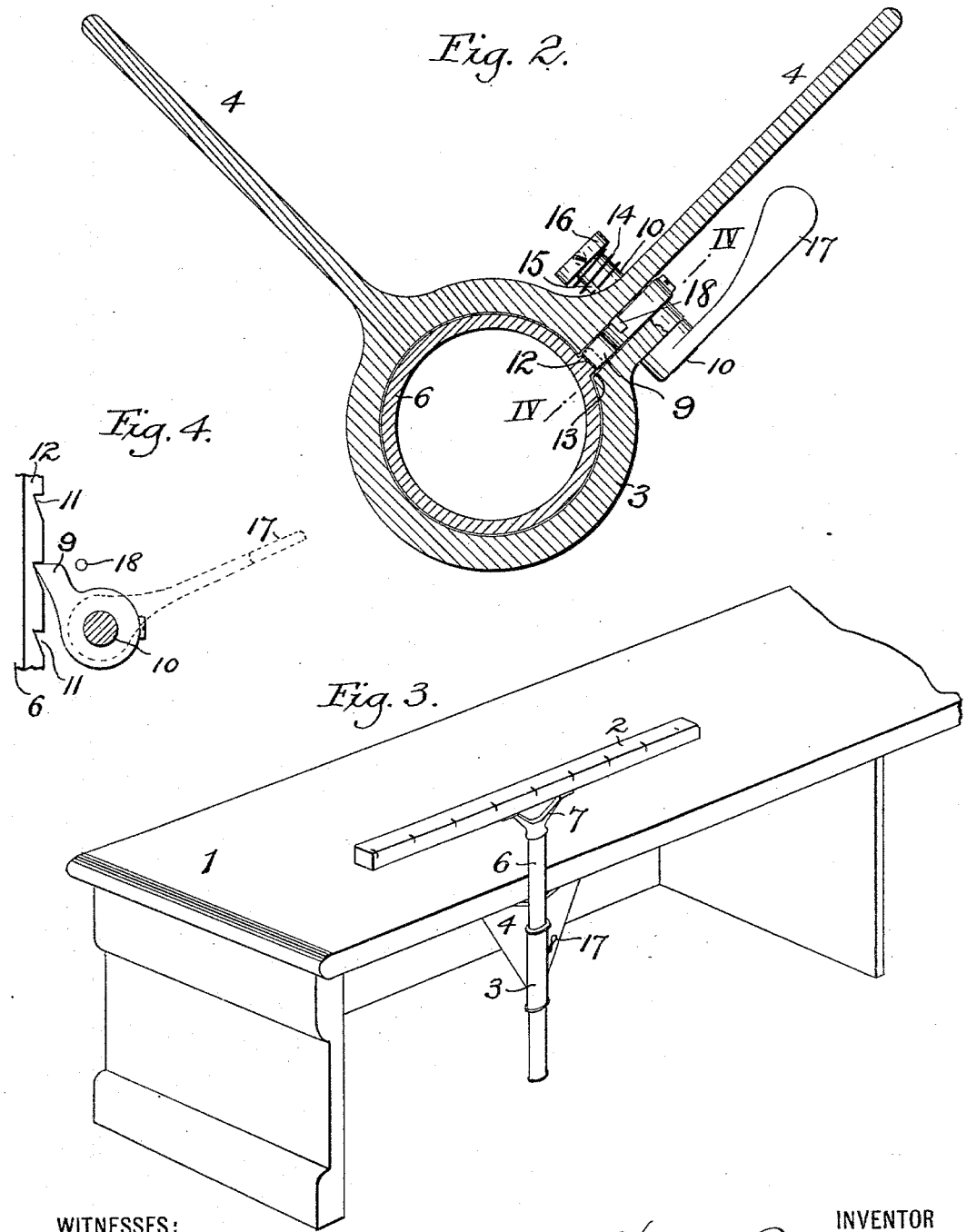

THEODORE P. FARMER, OF BOSTON, MASSACHUSETTS, ASSIGNOR TO THE LAMSON STORE EQUIPMENT COMPANY, OF SAME PLACE.

MEASURING DEVICE.

SPECIFICATION forming part of Letters Patent No. 563,850, dated July 14, 1896.

Application filed September 8, 1894. Serial No. 522,490. (No model.)

*To all whom it may concern:*

Be it known that I, THEODORE P. FARMER, a citizen of the United States of America, residing at the city of Boston, Suffolk county, State of Massachusetts, have invented certain new and useful Improvements in Measuring Devices, of which the following is a specification.

My invention relates to that class of measuring devices employed on counters in the linear measurement and sale of dry goods and in analogous situations, and is especially useful in connection with the machine which is the subject of application, Serial No. 504,027, filed by myself jointly with E. H. Parks and E. F. Parks, though it is to be understood that it may be employed in combination with other machines or devices.

In the display and inspection of dry goods the counter often becomes encumbered with bolts, rolls, or pieces of cloth, so that when the selection is made and the salesman is ready to measure and cut off the desired piece it is difficult or impossible to use the measuring machine or device, which latter is usually fixed to the counter. In such case the customer must be kept waiting until the counter is cleared by rolling up and putting away the undesired pieces.

It is the object of my invention to obviate these difficulties and to enable a measuring machine or device which is fixed or mounted upon the counter to be readily used at any height above the latter. By the use of my invention also the entire counter may be left free and unobstructed for the handling, measuring, and cutting off of goods.

With such object in view my invention comprises a measuring machine or device and a vertically-adjustable or movable support for the same through the medium of which the machine may be mounted upon any suitable foundation, such as a counter or salestable, or the floor, or both.

In order to make the invention more clearly understood, I have shown in the accompanying drawings means for carrying it into practical effect, without limiting my improvements in their useful applications to the particular construction which, for the sake of illustration, I have delineated.

In said drawings, Figure 1 is an elevation of so much of a measuring device as is necessary to an understanding of my invention. Fig. 2 is a horizontal sectional view on line II II, Fig. 1. Fig. 3 is a perspective view of a measuring device embodying my invention mounted upon a counter. Fig. 4 is a sectional detail view on line IV IV, Fig. 2.

Referring to the drawings, 1 is a counter, sales-table, or equivalent support for the display and measurement of goods.

2 is a measuring machine or device of any known or preferred character.

3 is a fixed part, such as a socket or bearing, serving as a guide and support, preferably of cylindrical form, and attached to a fixed base or support, such as a bracket 4. The latter in turn is suitably fixed upon any suitable foundation, for instance, attached to the under side of the counter by a flange 5.

6 is an upwardly and downwardly movable part, such as a post, fitting within the bearing 3 and longitudinally movable therein. This post is by preference in the form of a hollow cylinder, as seen in Fig. 2.

7 is a bracket or yoke fixed on the upper end of the post and carrying the measuring-machine 2, which may be held firmly in place on said yoke 7 by screws 8.

The upper end of the bearing 3 is situated below the top of the counter, so that when the latter is unoccupied the measuring-machine may be brought down level therewith.

The parts being arranged and combined as seen in Fig. 3, or in any equivalent way, it will be seen that the counter 1 may be fully occupied with pieces or rolls of goods, even to a depth of a foot or two, without interfering with the use of the measuring-machine, for the post 6 may be moved in its bearing 3 until said machine is brought level with the top of the pile of goods on the counter, and the piece selected to be cut off may then be readily applied to the machine and measured and severed.

Various means may be employed for supporting the post in the bearing at the desired height. I prefer to use a pawl 9, pivoted by a pin 10 in or on the bracket 4, and engaging notches or projections 11 on the post. The pawl is normally pressed toward the post by a spring 14 on one end of its shaft 10, which spring engages at one end a fixed pin 15 on the bracket 4, and is secured at its other end to a collar 16 on said shaft.

17 is a handle on the shaft 10 for releasing the pawl, and 18 is a stop for limiting the outward movement of the latter.

In order to keep the measuring-machine parallel with the counter, the post and bearing are caused to have a mutual engagement, which will prevent rotary without interfering with longitudinal movement of the post. To this end the post has formed on it a longitudinal rib 12, which fits in a corresponding groove 13 in the interior of the bearing, and the notches 11 already referred to are preferably formed in said rib.

I claim—

1. The combination with a measuring-machine, of a bracket adapted to be attached to a fixed support and having a bearing, an upwardly and downwardly extending post engaging said bearing and sliding therein, and means for securing the post at the desired height, substantially as set forth.

2. The combination of a measuring-machine, a post having a rib provided with notches or projections, and carrying said machine, a bearing having a groove for said rib, and a pawl mounted in the bearing and entering said groove, substantially as set forth.

In witness whereof I have hereunto signed my name and affixed my seal in the presence of two witnesses.

THEODORE P. FARMER. [L. S.]

Witnesses:
WM. S. LAWSON,
LAWRENCE BOND.